United States Patent
Arping et al.

(10) Patent No.: US 6,392,347 B2
(45) Date of Patent: *May 21, 2002

(54) INDUSTRIAL TRUCK WITH A VOLTAGE TRANSFORMER TO SUPPLY PULSED DC TO A LAMP

(75) Inventors: Franz-Josef Arping, Hamburg; Wolfgang Heinrich Grothe, Buchholz; Berthold Hacker, Goldbach, all of (DE)

(73) Assignee: Still GmbH (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/449,150

(22) Filed: Nov. 24, 1999

(30) Foreign Application Priority Data

Nov. 25, 1998 (DE) .......................... 198 54 416

(51) Int. Cl.[7] .................................... B06Q 1/02
(52) U.S. Cl. .......................... 315/82; 323/299
(58) Field of Search ................ 323/282, 299, 323/351; 315/82

(56) References Cited

U.S. PATENT DOCUMENTS

| | | | | |
|---|---|---|---|---|
| 3,733,540 A | * | 5/1973 | Hawkins | |
| 4,468,569 A | * | 8/1984 | Norris | 323/299 |
| 4,677,345 A | * | 6/1987 | Nilssen | 315/209 R |
| 4,988,942 A | * | 1/1991 | Ekstrand | 323/282 |
| 5,278,490 A | * | 1/1994 | Smedley | 323/282 |
| 5,365,144 A | * | 11/1994 | Layh | 325/58 |
| 5,399,958 A | * | 3/1995 | Iyoda | 323/282 |
| 5,504,395 A | * | 4/1996 | Johnson et al. | 325/71 |
| 5,510,698 A | * | 4/1996 | Stankovic et al. | 323/282 |
| 5,757,214 A | * | 5/1998 | Stoddard et al. | 323/282 |
| 5,892,353 A | * | 4/1999 | Yama | 323/282 |
| 5,969,513 A | * | 10/1999 | Clark | 323/282 |
| 5,969,515 A | * | 10/1999 | Oglesbee | 323/351 |
| 5,982,151 A | * | 11/1999 | Nagai et al. | 323/299 |
| 6,025,706 A | * | 2/2000 | Takimoto et al. | 323/282 |
| 6,154,375 A | * | 11/2000 | Majid et al. | 363/16 |
| 6,163,140 A | * | 12/2000 | Garnett et al. | 323/234 |
| 6,198,258 B1 | * | 3/2001 | Ando et al. | 323/222 |
| 6,307,330 B1 | * | 10/2001 | So | 315/82 |

* cited by examiner

*Primary Examiner*—Jeffrey Sterrett
(74) *Attorney, Agent, or Firm*—Webb Ziesenheim Logsdon Orkin & Hanson, P.C.

(57) ABSTRACT

An industrial truck is provided with a direct current power supply and at least one electrical user (2), e.g., a lighting device located in a housing, wherein the power supply voltage of the power supply (3) is greater than the nominal voltage of the user (2). To connect the user (2) to the power supply, there is a voltage transformer (4) which is located inside the housing or in the immediate vicinity of the housing. The invention also relates to a voltage transformer which applies a power supply voltage to a user (2) in pulses, so that the power delivered to the user, as an average over time, does not exceed the nominal power of the user (2).

10 Claims, 1 Drawing Sheet

INDUSTRIAL TRUCK WITH A VOLTAGE TRANSFORMER TO SUPPLY PULSED DC TO A LAMP

FIELD OF THE INVENTION

This invention relates generally to a voltage converter to connect an electrical user, such as a lighting device, to a power supply, the voltage of which power supply is higher than a nominal voltage of the user. The invention also relates to an industrial truck with a direct current power supply and at least one electrical lighting device in a housing, wherein the power supply voltage is higher than the nominal voltage of the lighting device, which industrial truck has a voltage transformer to connect the lighting device to the power supply. The invention further relates to a method of supplying power to an electrical user, in particular a lighting device, in which the power supply voltage is higher than the nominal voltage of the electrical user.

BACKGROUND OF THE INVENTION

Halogen lamps have been found to be highly reliable for use in headlights and floodlights on account of their particularly high light output and the high quality of their light. Commercially available halogen lamps generally have a nominal voltage of 12 V or 24 V. If electrically powered fork lift trucks are provided with a halogen lighting system, it is customary to transform the battery voltage of the fork lift truck, which is generally 48 V or 80 V, to 12 V or 24 V by means of a voltage transformer to power the lighting system. Of course, 48 V and 80 V incandescent lamps are available, but on account of their deficient impact strength compared to halogen lamps, these incandescent lamps are typically deemed unsuitable for use on fork lift trucks and on industrial trucks in general.

A voltage transformer is generally used which, in addition to providing the power supply for the headlights, is also used for other applications. Such voltage transformers are provided with a very complex and expensive regulation system and an output section. These measures are necessary because for many applications, a constant voltage must be guaranteed under different loads.

Therefore, it is an object of this invention to provide a voltage transformer and a method of supplying power to an electrical user of the type described above, wherein the voltage transformer has fewer components and is smaller than similar transformers of the known art. An additional object of the invention is to provide an industrial truck of the type described above in which the installation space required for the voltage transformer and for the lighting system can be reduced over that typically required.

SUMMARY OF THE INVENTION

The invention teaches that these objects can be accomplished with a voltage transformer in which a clock pulse generator is located in a circuit between a power supply and an electrical user, which clock pulse generator applies the power supply to the user in pulses so that the power delivered to the user, averaged over time, preferably does not exceed the nominal power of the user.

In terms of the method of the invention, the power supply voltage is applied in short pulses to the user, so that the power delivered to the user, averaged over time, preferably does not exceed the nominal power of the user.

The invention recognizes the ability of many users to withstand, for a brief period, electrical power levels that are above the nominal power of the user. Therefore, in contrast to the voltage transformers used in the known art, the power supply voltage in the practice of the invention is not transformed down to the nominal voltage of the user. Rather, the full power supply voltage is applied to the user in brief pulses. During the pulses, of course, the nominal power of the user is exceeded, but in an average over time, e.g., from the beginning of one pulse until the end of the next pulse, this nominal level is maintained. Damage to the consumer can be prevented by an appropriate choice of the pulse length and the pulse frequency.

This invention is particularly well suited for the connection of electrical lighting means or devices to a power supply voltage. The term "electrical lighting means" as used herein refers to all types of lighting devices that operate on electrical energy and give off light, such as, for example but not to be considered as limiting to the invention, incandescent lamps, incandescent bulbs and halogen lamps and the like. For example, incandescent bulbs, on account of the mass of the filament and its related inertia, can withstand, for brief periods, power levels that are significantly higher than the nominal power levels reached in continuous operation without the filament burning out.

The length and/or the frequency of the pulses of the voltage transformer are preferably variable. The pulse and/or the pulse frequency are advantageously adapted to the power supply voltage and to the respective consumers. On one hand, this makes it possible to connect the same user to different power supply voltages and, on the other hand, the voltage transformer can be optimized to the voltage required by the user.

Conventionally, clocked or switched-mode voltage transformers operate in the frequency range from 10 kHz to 100 kHz. It is now recognized that such high frequencies are not necessary for many users, in particular for lighting means such as incandescent lamps. Preferably, therefore, the frequency of the pulses is between about 100 Hz and about 1000 Hz, and more preferably between about 200 Hz and about 500 Hz. The choice of this frequency range has the advantage that on one hand the electromagnetic interference and the dynamic losses are negligible, but on the other hand the users still work satisfactorily on account of their inertia. In other words, on account of their inertia, incandescent bulbs, for example, do not begin to flicker.

With some users, in particular with lighting means, small fluctuations in the applied voltage can be tolerated. If a voltage transformer supplies only this type of user, it is advantageous not to provide in the voltage transformer any means to smooth the voltage applied to the users. The voltage transformation preferably occurs without any output-side voltage smoothing, or at any rate with only very simple output-side voltage smoothing.

The level of the power supply voltage and/or the nominal voltage of the user are preferably fixed, and the mark-to-space ratio of the clock pulse generator is automatically adjusted to the level of the power supply voltage and the nominal voltage of the user. In this manner, a continuous, automatic voltage recognition is achieved, as a result of which, for example, the entire voltage range from about 24 V to about 96 V is allowable for use with a nominal voltage of about 12 V or about 24 V.

It is advantageous if the pulse length and/or the pulse frequency is set so that when the user is turned on, it is initially supplied with a lower power than in subsequent continuous operation. In this manner, a type of soft startup action is realized for the user. Following start-up, the pulse length is slowly increased from zero to the length required for the nominal power of the user. The duration of this startup process is preferably set by the capacity of a variable capacitor. The slow increase of the power supplied to the user has been found to be very advantageous in terms of the useful life of the user. The power-up process, i.e. the time required until the nominal power is reached, is preferably approximately one second.

The invention teaches that it is particularly advantageous to use the voltage transformer of the invention to supply power to electrical lighting means located in a housing, for example to a halogen lamp in a headlight casing. In that case, it is advantageous for reasons of space to integrate the voltage transformer into the housing, e.g., to locate it in the immediate vicinity of the housing or to attach it to the exterior of the housing.

It has been found to be particularly favorable, because it is particularly space-saving, to integrate the voltage transformer directly into the lighting means. If the voltage transformer is integrated into the base of an incandescent bulb, for example, the incandescent bulb can be used in a broad voltage range, for example from about 12 V to about 80 V.

For safety reasons it is appropriate to provide more than one voltage transformer for all the users. For example, to take precautions against a total failure of the lighting system of a vehicle, it is favorable, if a plurality of voltage transformers are used, to have each of them supply only some of the lighting means. For example, it is appropriate in particular for each main headlight of the lighting system to have its own voltage transformer.

The invention also relates to an industrial truck, in particular to a fork lift truck, with a direct current power supply and at least one lighting means located in a housing, wherein the power supply voltage is greater than the nominal voltage of the lighting means, with a voltage transformer to connect the lighting means to the power supply voltage.

The invention teaches that the space required for the installation of the voltage transformer and the lighting means can be reduced if the voltage transformer is located inside the housing or in the immediate vicinity of the housing.

As a result of the installation or attachment of the voltage transformer in or on the housing of the lighting means, only very short lines or connections are required between the voltage transformer and the lighting means. This spatial proximity makes it possible to do without an output-side voltage smoothing on the voltage transformer. Preferably, therefore, the voltage converter does not include means to smooth the voltage applied to the lighting means. Such smoothing means are generally required on the voltage transformer and lighting system of the known art that are located at a significant distance from each other because when the lines are long and there is no output filtering, excessive interference builds up in the lines.

The housing is advantageously realized so that it acts as an electromagnetic shield. Thus, there is no need for additional measures directly on the voltage transformer to prevent electromagnetic interference.

The invention is suitable in particular for use on industrial trucks with a power supply voltage of more than about 24 V and for lighting means with a nominal voltage of about 12 V or about 24 V.

BRIEF DESCRIPTION OF THE DRAWINGS

The invention and further details of the invention are explained in greater detail below with reference to the exemplary embodiments illustrated in the accompanying drawing figures, in which.

DESCRIPTION OF THE PREFERRED EMBODIMENT

Figure 1:
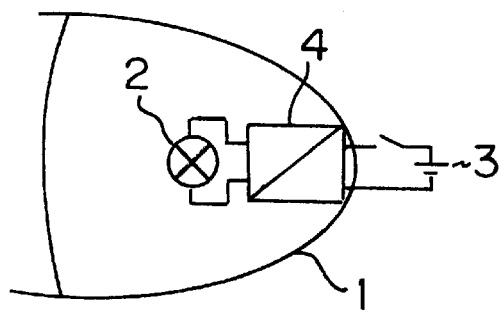
FIG. 1 is a schematic drawing of a headlight with an integrated voltage transformer.

FIG. 1 shows, by way of example, a main headlight 1 installed on a fork lift truck. The electrical user, e.g., lighting means, preferably a halogen lamp 2, used in this headlight preferably has a nominal voltage of about 24 V. The battery 3 of the fork lift truck, on the other hand, provides a higher power supply voltage, e.g., of about 80 V. A voltage transformer 4 is therefore provided to transform the battery voltage to the nominal voltage of the lamp 2 in accordance with the invention.

The voltage transformer 4 is preferably integrated into the headlight 1, i.e., is located inside the housing of the headlight 1. Because the lamp 2 is relatively insensitive to electromagnetic interference, direct current voltage fluctuations and noise, the voltage transformer 4 preferably does not have any filter or other means for voltage smoothing on the output side. The invention teaches that the elimination of smoothing means for the output voltage is made possible by a shortest possible connection between the halogen lamp 2 and the voltage transformer 4.

Figure 2:
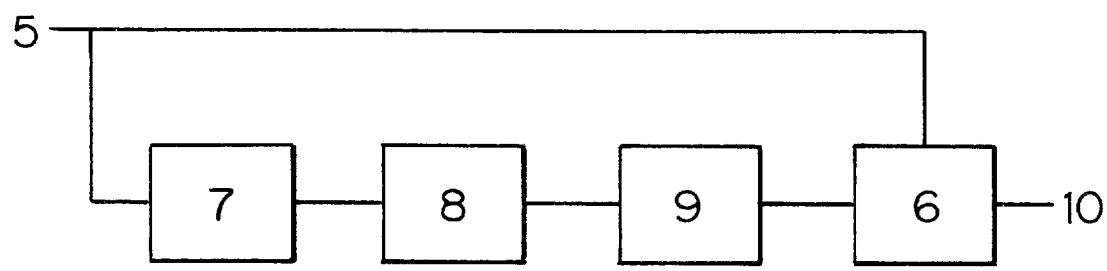
FIG. 2 is a schematic diagram of a voltage transformer of the invention.

The construction of the voltage transformer 4 is illustrated schematically in FIG. 2. The input 5 of the voltage transformer 4 is connected with the battery 3 of the fork lift truck. A direct current voltage of about 80 V is therefore applied to the input 5. The input voltage of 80 V is delivered on one hand directly to a final stage 6, e.g., a power transistor, and on the other hand via a voltage divider 7 and a triangle generator 8 to a clock pulse generator 9. The clock pulse generator 9 delivers the power supply voltage of 80 V made available by the battery 3 to the output 10 of the voltage transformer 4. Smoothing of the output voltage and a galvanic separation are unnecessary.

The voltage of the battery 3 is applied to the lamp 2 in short pulses lasting about 1 ms at a frequency of about 200 Hz. It has been found that commercial incandescent lamps and halogen lamps do not burn out even at about ten times the nominal power over periods of about 1 ms, as long as, in an average over time of the mark-to-space ratio, the nominal power is substantially maintained. To increase the useful life of the lamp 2, the pulse length is slowly increased immediately after the lamp is turned on from about zero to about 1 ms over approximately one second.

It will readily be appreciated by those skilled in the art that modifications may be made to the invention without departing from the concepts disclosed in the foregoing description. Such modifications are to be considered as included within the scope of the invention. Accordingly, the particular embodiments described in detail hereinabove are illustrative only and are not limiting as to the scope of the invention, which is to be given the full breadth of the appended claims and any and all equivalents thereof.

What is claimed is:

1. A forklift truck comprising:

a DC power supply which outputs a first DC voltage;

an enclosure;

a lamp received in the enclosure, the lamp configured to operate at a second, nominal DC voltage less than the first DC voltage and to dissipate a nominal amount of power at the second voltage;

means connected between the DC power supply and the lamp for supplying the first DC voltage to the lamp in pulses each having a desired pulse length related to the first DC voltage whereby the power dissipated by the lamp in response to the pulses does not exceed the nominal power dissipation of the lamp.

2. The forklift truck as set forth in claim 1, wherein the lamp receives the first DC voltage from the DC power supply without smoothing.

3. The forklift truck as set forth in claim 1, wherein the means for supplying includes:

a voltage divider connected to receive the first DC voltage and to output a third DC voltage which is less than the first DC voltage;

pulse generating means connected to receive the third DC voltage and to output control pulses; and a final stage connected to receive the first DC voltage and the control pulses and to deliver the pulses of the first DC voltage based on the control pulses.

4. The forklift truck as set forth in claim 3, wherein the pulse generating means includes:

a triangle generator connected to receive the third DC voltage and to output a waveform based on the third DC voltage; and a clock pulse generator connected to receive the waveform and to output the control pulses.

5. The forklift truck as set forth in claim 1, wherein the means for supplying is received in the enclosure.

6. The forklift truck as set forth in claim 1, wherein the pulses are delivered at a frequency between 100 and 1000 Hz.

7. The forklift truck as set forth in claim 1, wherein, when the means for supplying is initially connected to receive the first DC voltage, the means for supplying increases the pulse length to the desired pulse length.

8. The forklift truck as set forth in claim 7, wherein the pulse length is increased from about 0 to about 1 ms.

9. The forklift truck as set forth in claim 1, wherein the lamp is one of an incandescent lamp, an incandescent bulb and a halogen lamp.

10. The forklift truck as set forth in claim 1, wherein:

the first DC voltage is at least 48 volts DC; and the second DC voltage is no greater than 24 volts DC.

* * * * *